(12) United States Patent
Karlsson

(10) Patent No.: US 11,981,366 B2
(45) Date of Patent: May 14, 2024

(54) PORTABLE AIR-FILTERING DEVICE

(71) Applicant: bubl. AB., Nyköping (SE)

(72) Inventor: Conny Karlsson, Nyköping (SE)

(73) Assignee: bubl. AB. (SE)

( * ) Notice: Subject to any disclaimer, the term of this patent is extended or adjusted under 35 U.S.C. 154(b) by 420 days.

(21) Appl. No.: 17/415,029

(22) PCT Filed: Nov. 8, 2019

(86) PCT No.: PCT/EP2019/080690
§ 371 (c)(1),
(2) Date: Jun. 17, 2021

(87) PCT Pub. No.: WO2020/126208
PCT Pub. Date: Jun. 25, 2020

(65) Prior Publication Data
US 2022/0063698 A1 Mar. 3, 2022

(30) Foreign Application Priority Data
Dec. 20, 2018 (SE) .................................... 1851622-9

(51) Int. Cl.
B62B 9/14 (2006.01)
F24F 8/108 (2021.01)
(Continued)

(52) U.S. Cl.
CPC ................ B62B 9/14 (2013.01); F24F 8/108 (2021.01); F24F 8/158 (2021.01); F24F 8/192 (2021.01);
(Continued)

(58) Field of Classification Search
CPC ..... B62B 9/14; B62B 2204/00; B60N 2/2845; B60N 2/2854; B60N 2/5621;
(Continued)

(56) References Cited

U.S. PATENT DOCUMENTS 5,943,716 A 8/1999 Chu
6,019,421 A * 2/2000 Roh ........................ A47D 15/00
297/184.13

FOREIGN PATENT DOCUMENTS

CN 105216852 1/2016
CN 105617564 A * 6/2016 ........... A47C 21/044
(Continued)

OTHER PUBLICATIONS

Patent Cooperation Treaty (PCT), International Search Report and Written Opinion for Application PCT/EP2019/080690 filed Nov. 8, 2019, dated Jan. 27, 2020 , International Searching Authority, EP.

Primary Examiner — Lori Lyjak
(74) Attorney, Agent, or Firm — McDonald Hopkins LLC

(57) ABSTRACT

The object of the present invention is to reduce the exposure of polluted air to a baby, and in particular to minimize the pollutions inhaled by a baby when strolling, walking or transporting a baby in an exterior environment. The object is attained by providing a portable device for filtering air, the device being adapted to be arranged in association with a top end of a baby-transporting device. With such an air-filtering device, air from outside of the baby-transporting device may be filtered and purified before being provided in a well-distributed manner to the area of the baby-transporting device where a baby is positioned.

17 Claims, 12 Drawing Sheets

(51) Int. Cl.
  *F24F 8/158*   (2021.01)
  *F24F 8/192*   (2021.01)
  *F24F 8/99*    (2021.01)
  *F24F 13/28*   (2006.01)

(52) U.S. Cl.
  CPC ............... *F24F 8/99* (2021.01); *F24F 13/28* (2013.01); *B62B 2204/00* (2013.01); *F24F 2221/12* (2013.01); *F24F 2221/38* (2013.01)

(58) Field of Classification Search
  CPC . B60N 2/5635; F24F 3/16; F24F 7/007; F24F 8/10; F24F 8/99; F24F 8/158; F24F 8/192; F24F 8/108; F24F 9/00; F24F 13/28; F24F 2221/12; F24F 2221/38
  See application file for complete search history.

(56) References Cited

FOREIGN PATENT DOCUMENTS

| | | | | | |
|---|---|---|---|---|---|
| CN | 106553684 | A | * | 4/2017 | ............... B62B 9/14 |
| CN | 207384617 | U | * | 5/2018 | |
| FR | 2871349 | | | 12/2005 | |
| GB | 2301879 | A | * | 12/1996 | ............. B62B 9/142 |
| KR | 20180053051 | A | * | 5/2018 | |
| WO | WO-2016078773 | A1 | * | 5/2016 | ........... A47C 21/044 |
| WO | 2017058507 | | | 4/2017 | |

\* cited by examiner

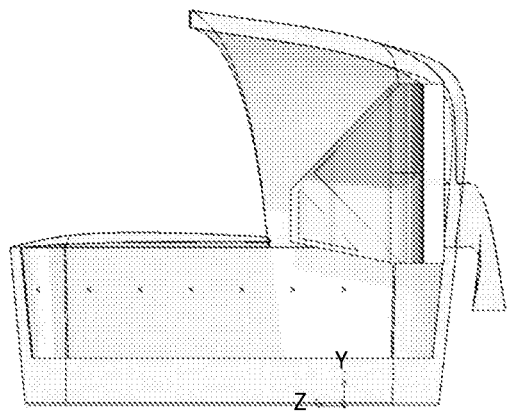
Fig. 10a
| Measuring points | Y [m] | Z [m] |
|---|---|---|
| 1 | 0,220 | 0 |
| 2 | 0,220 | 0,100 |
| 3 | 0,220 | 0,200 |
| 4 | 0,220 | 0,300 |
| 5 | 0,220 | 0,400 |
| 6 | 0,220 | 0,500 |
| 7 | 0,220 | 0,600 |
Fig. 10b
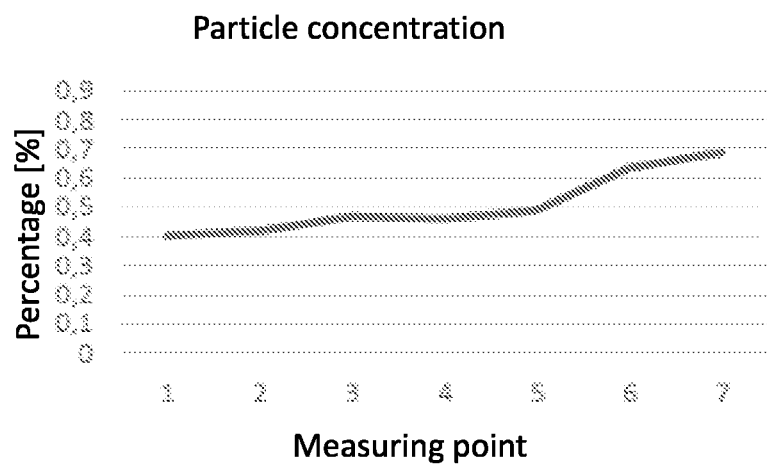
Fig. 10c
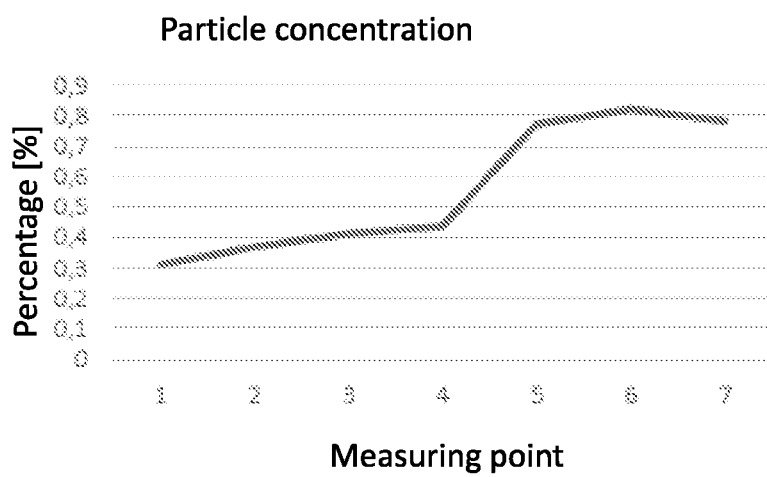
Fig. 10d

PORTABLE AIR-FILTERING DEVICE

CROSS-REFERENCE TO RELATED APPLICATION

This application is a 35 U.S.C. § 371 national stage application of PCT Application No. PCT/EP2019/080690 filed on Nov. 8, 2019, entitled "PORTABLE AIR-FILTERING DEVICE," which claims priority to Swedish Patent Application No. 1851622-9 filed on Dec. 20, 2018, each of which are incorporated herein in their entirety by reference.

TECHNICAL FIELD

The present invention relates to a portable air-filtering device. The portable air-filtering device is configured to be arranged in association with a baby-transporting device.

BACKGROUND ART

Air quality is an increasing problem in the world due to pollution. In particular, in urban areas, the air quality is compromised due to traffic from vehicles driven on carbon-based fuel, particularly from the fumes and gases they exhaust. However, also particles that are brought into the air by the friction and mechanical action from tires against the surface on which they are transported contribute to the air pollution. Furthermore, also industry, warming of houses with carbon based material etc. causes the air to be polluted by particles.

Infants are very sensitive to polluted air and exposure to such polluted air may lead to for instance lung diseases, but also other diseases due to uptake of for instance heavy metals via the air into the lungs or into the blood stream and/or other tissues. Thus, there is a need for solutions on how to protect small infants against polluted air.

SUMMARY OF THE INVENTION

In the present disclosure, the term "baby" will hereby be used, but should be understood to comprise "baby", "newborn", "toddler", "child" and "infant".

The object of the present invention is to reduce the exposure of polluted air to a baby. In particular, the object of the present invention is to minimize the pollutions inhaled by a baby when strolling, walking or transporting a baby in an exterior environment. The pollutions in question may be macroparticles, microparticles and gases.

The object is attained by providing a portable device for filtering air, said device being adapted to be arranged in association with a top end of a baby-transporting device. With such an air-filtering device, air from outside of the baby-transporting device may be filtered and purified before being provided to the space of the baby-transporting device where a baby is positioned. The idea is to provide a local environment of purified air around the baby, and in particular, around the baby's head, so as to prevent any air that has not been filtered and purified from entering the baby-transporting device, in particular where the baby is positioned. Thus, an air cushion of purified air is provided around the baby.

Thus, according to a first aspect, the present invention provides for a portable air-filtering device comprising:
an air-impermeable back layer;
an air-permeable front layer arranged opposite to the back layer, wherein the air-filtering device is configured to be arranged with the front layer directed towards an inner area of the baby-transporting device; said back layer and front layer being arranged to form an internal cavity there between;
a first air inlet arranged in the back layer in fluid communication with the internal cavity;
an outer air filter arranged to cover the air inlet;
a first power driven ventilator arranged to draw air from an external surrounding through the air inlet into the internal cavity, so that an overpressure is generated in the cavity;
a baffle arranged in the internal cavity to direct the air inside the internal cavity; and an inner air filter arranged to face the inner area of the baby-transporting device.

The overpressure in the internal cavity will force the air to flow through the front layer towards the inner area B, wherein the front layer comprises a material configured such that the air will be evenly distributed in the front layer and when leaving the front layer, whereby the air will be evenly distributed through the inner air filter, thereby providing a local environment of purified air in the inner area of the baby-transporting device.

The inner air filter is adapted to remove microparticles, having a size of 0.1-1000 μm, from the air.

According to one embodiment, the air-filtering device is essentially U-shaped with a back portion and side portions. The air inlet may be arranged in the back portion, the baffle directing the air from the back portion to the side portions of the air-filtering device.

The air-filtering device may be flexible.

According to one embodiment, the inner air filter is composed of an electrostatically charged material. The electrostatically charged material may be a non-woven textile, preferably of spunbound polypropylene. According to yet another embodiment, the inner air filter is a triboelectric filter. According to yet another embodiment, the inner air filter may comprise active carbon.

According to one embodiment, the front layer comprises an open cell foam material.

According to one embodiment, the first ventilator is capable of causing a flow of air of 100-350 L/minute into the internal cavity of the air-filtering device.

According to one embodiment, the airflow provided to the inner area B is less than 0.15 m/sec.

According to one embodiment the outer air filter is a nonwoven textile, an open cell foam material, or a mesh material, adapted to filter larger objects and macroparticles from the air.

According to one embodiment, the device further comprises at least one second air inlet arranged adjacent to the inner area, and at least one second ventilator arranged in connection with the second air inlet, said second ventilator being arranged to draw air from the inner area through the second air inlet into the internal cavity.

The second ventilator has a capacity that is lower than a capacity of the first ventilator, such as 50%, 40%, 30%, 20%, 10% or 5% of the capacity of the first ventilator.

According to yet another embodiment, the ventilator is driven by a battery.

According to a second aspect, the invention provides for a baby-transporting device comprising the air-filtering device according to the above. According to one embodiment thereof, the baby-transporting device is a pram, a stroller, a baby cot, a baby carrier or a baby car seat.

BRIEF DESCRIPTION OF THE DRAWINGS

FIG. 4a discloses the arrangement of the device and the pram, and FIG. 4b discloses the airflow in relation to a baby positioned in the inner area B.

FIG. 5a is a photo of the set up in the pram, and FIG. 5b is a schematic top view of the entire test set-up.

FIG. 8a illustrates the airflow for a device with one air inlet, and FIG. 8b illustrates the airflow for a device with more than one air inlet.

FIG. 9a illustrates the degree or purification for a device with one air inlet, and FIG. 9b illustrates the degree of purification for a device with more than one air inlet.

FIGS. 10a-d further illustrates the degree of purification of air in different locations in a pram equipped with the present device.

DETAILED DESCRIPTION

Figure 1:
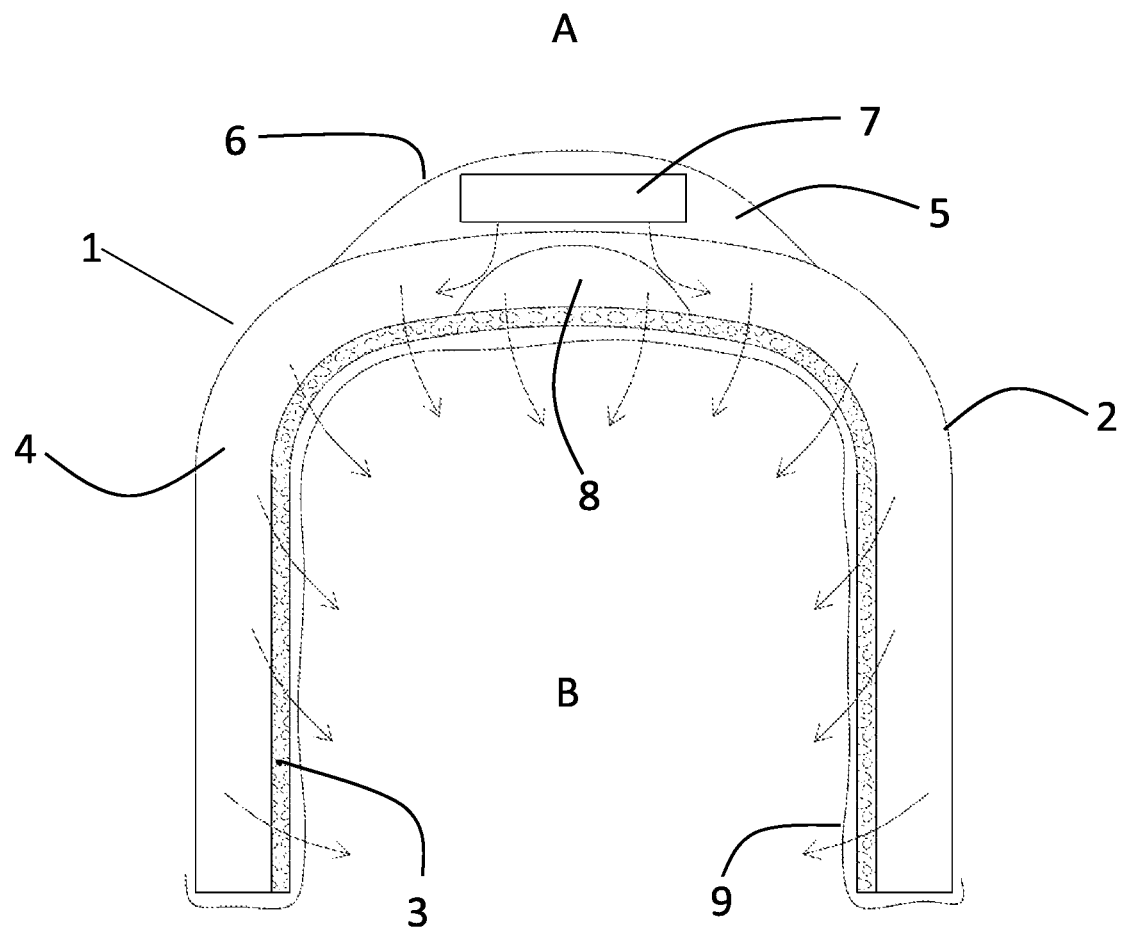
FIG. 1 is a cross-sectional view of an embodiment of the air-filtering device according to the present disclosure.

The present invention provides for a solution in order to minimize the pollutions inhaled by a baby when strolling, walking or transporting a baby in an exterior environment. Thus, the present invention provides for a portable air-filtering device, the air-filtering device being configured to be arranged in association with a top end of a baby-transporting device. Said baby-transporting device may be a pram, a stroller, a baby cot, a baby carrier or a baby car seat. By top end is meant a top edge of the baby-transporting device, or an inner surface in an upper area of the baby-transporting device. The top end is further meant to be a part of the baby transporting device where a baby's head is positioned, or a part close to or directly adjacent to the part where the baby's head is positioned. The air-filtering device may be fitted on the top edge of a baby-transporting device. For a baby-transporting device equipped with a canopy or convertible top, the air-filtering device may be fitted against the inside surface of said canopy or convertible top. The fastening means for fitting said air-filtering device to a baby transport device are not crucial, as long as they do not negatively affect the function of the air-filtering device as disclosed herein.

The air-filtering device comprises an air-impermeable back layer and an air-permeable front layer arranged opposite to the back layer, wherein the air filter device is configured to be arranged with the front layer directed towards an inner area of the baby-transporting device; said back layer and front layer being arranged to form an internal cavity there between. Said inner area is where a baby is to be positioned within the baby-transporting device.

Said air-filtering device further comprises a first air inlet arranged in the back layer and in fluid communication with the internal cavity; an outer air filter arranged to cover the first air inlet; and a first power driven ventilator arranged to draw air from the external surroundings through the first air inlet and into the internal cavity, so that an overpressure is generated in the cavity. Air always choses a path with less flow resistance, and the back layer is air-impermeable and the front layer air-permeable. Thus, when an overpressure is built up and generated in the cavity by said first ventilator, the air in the cavity will be forced to exit the air-filtering device through the air-permeable front layer. Thus, a local environment with purified air is accomplished in the inner area.

The first air inlet preferably comprises an aperture in the air-impermeable back layer and said first air inlet is tightly arranged in said back layer. The ventilator comprises a motor and a rotating arrangement of vanes or blades. Air enters the first air inlet by suction caused by the ventilator and is subsequently supplied to the internal cavity. Although "ventilator" is the term used in the present disclosure to disclose the means by which air is drawn into the internal cavity, there are other terms normally used in connection with the same type of functional entity, such as a "fan".

The air-filtering device furthermore comprises a baffle arranged in the internal cavity to direct the air inside the internal cavity. Thus, the air drawn from the first air inlet into the cavity by the first ventilator will be distributed throughout the entire internal cavity. The baffle prevents the air from taking the shortest distance to exit the air-filtering device through the air-permeable front layer directly opposite the first air inlet, which would otherwise cause a draught over the inner area B. Thereby the purified air will exit the air-filtering device over a larger surface of the front layer. Furthermore, the distribution of the air throughout the entire internal cavity, and thus exiting the device over a larger surface of the front area, will entail a lower airflow to be provided in the inner area. This is an important aspect as it is not desirable for a baby to be positioned in a draughty environment. The baffle may be manufactured by any suitable material, such as a plastic, metal, or any other material that has enough stiffness to withstand the airflow and to direct said airflow within the internal cavity. The material of the baffle must not bend or otherwise change shape upon exposure to the airflow provided to the internal cavity by the ventilator.

The air-permeable front layer of the air-filtering device comprises a material with a lower airflow resistance than the air-impermeable back layer. The overpressure in the internal cavity will force the air to flow through said front layer towards the inner area, wherein the front layer comprises a material configured such that the air will be evenly distributed within the front layer before exiting said front layer, whereby the air will be evenly distributed through the inner air filter, thereby providing a local environment of purified air in the inner area of the baby-transporting device. Thus, it is the combination of the material of the air-permeable front layer, the air-impermeable back layer, and the ventilator actively drawing air into the internal cavity of the air-filtering device, which leads to an overpressure. The lower airflow resistance of the material in the front layer offers some resistance against the air from exiting the device, in the sense that the air has to travel through said material in order to exit the device. Preferably, the air-permeable front layer comprises a material allowing a turbulent airflow internally, so as to ensure a vaster distribution of air within the material, thereby ensuring that the air will exit said material over a larger surface of the front layer. The inner air filter preferably does not provide any significant airflow resistance. However, it is feasible that also the inner air filter could be comprised of a material that offers a low level of airflow resistance, as long as it does not negatively affect the airflow from the internal cavity and into the inner area.

The material of the front layer may for instance be a cellular plastic in a foam material or a polyester resin with an open cell structure and low density. A cellular plastic is a type of plastic containing numerous cells or pores disposed uniformly throughout its mass. An open cell structure means that the cells are connected to each other, which makes the material soft, light and airy. Such a material typically has a higher permeability than a material with a closed cell structure. The front layer may comprise a material with a cell diameter of between 2000 to 3500 micrometres. An open cell structure and said cell diameter results in a high permeability/porosity of the front layer, which causes a low airflow resistance and thus a limited pressure drop of the airflow when the air passes through the front layer. The flow resistance and the pressure drop causes the air to spread and to be distributed within and throughout the front layer. This way, the flow area through which the air is discharged from the device is larger than a cross-sectional area of the inlet to the internal cavity, and a substantially even distribution of air is achieved over a larger area. By having a larger outlet area than inlet area, the air is discharged with a lower flow rate than when supplied to the cavity through the inlet, by means of the ventilator. A low flow rate is advantageous in that draught is avoided over the inner area.

The air-filtering device further comprises an inner air filter arranged to face the inner area of the baby-transporting device. The inner air filter will filter the air from microparticles in the air, such as heavy metals, gases etc., that may be harmful for a baby to inhale. The inner filter is preferably made of an electrostatically charged material. Thereby, both negatively charged particles and positively charged particles in the air will be filtered. Preferably, the electrostatically charged material is a non-woven textile, preferably of spunbound polypropylene. The natural charge gained during manufacturing of said material attacks both negative and positive particles from the airflow, which results in high capturing rates of microparticulate contaminants. Thus, said material encompasses both high filtration efficiency and dust-holding qualities, together with low airflow resistance. According to one preferred embodiment, the inner air filter is a triboelectric filter.

The inner air filter preferably has a basis weight of 40-100 $g/m^2$, more preferably 50-100 $g/m^2$, even more preferably 60-90 $g/m^2$, for instance 60 $g/m^2$, 65 $g/m^2$, 70 $g/m^2$, 75 $g/m^2$, 80 $g/m^2$, 85 $g/m^2$, or 90 $g/m^2$.

The inner air filter preferably has an airflow resistance of 5-10 Pa, preferably 7-9 Pa, when tested at 9.5 m/min over 100 $cm^2$.

Furthermore, the inner air filter preferably has a thickness of 0.5-5 mm, preferably 1-4 mm, even more preferably 1-3 mm, and most preferably 1.5-2 mm.

According to another preferred embodiment, active carbon is comprised in the inner air filter. Thereby the air may also be purified from gases. The active carbon may be comprised as part of a composition comprising the active carbon, said composition being added to the material that the inner air filter comprises. Alternatively, active carbon may be included in the inner filter material directly.

It is important that the inner air filter is capable of purifying air from micropollutants, and optionally gases, while not substantially affecting the airflow through the device. Particles as small as 0.1 μm to 2.5 μm may be removed from the air by the inner air filter. The inner air filter is adapted to remove particles in the sizes of 0.1-1000 μm, or more preferably 0.1-900 μm, 0.1-800 μm, 0.1-700 μm, 0.1-600 μm, 0.1-500 μm, 0.1-400 μm, 0.1-300 μm, 0.1-200 μm, 0.1-100 μm, 0.1-90 μm, 0.1-80 μm, 0.1-70 μm, 0.1-60 μm, 0.1-50 μm, 0.1-40 μm, 0.1-30 μm, 0.1-20 μm, 0.1-15 μm, 0.1-10 μm, 0.1-5 μm, 0.1-4 μm, 0.1-3 μm, 0.1-2.5 μm, 0.1-1 μm, 0.1-0.5 μm, or 0.1-0.3 μm. The size refers to the diameter of the particle.

The air-filtering device may be essentially U-shaped with a back portion and side portions. According to one embodiment, the first air inlet is arranged in the back portion, wherein the baffle directs the air from the back portion to the side portions of the device. Furthermore, the air-filtering device may be flexible. The air-filtering device may be flexible in its entirety or in parts of the device. According to one embodiment, the back portion may be rigid or semi-rigid, and the side portions flexible. This would make the air-filtering device versatile in terms of what kind of baby-transporting device in association with which the air-filtering device should be arranged. For instance, different brands of baby prams have a general uniform shape, but the exact measurements regarding width, length and curvature of the front of the pram may vary. By the solution mentioned above, one single model of the air-filtering device may be used in most baby prams, regardless of brand or model. The same versatility would apply for different brands and models of strollers, baby carriers and baby car seats.

According to one embodiment, the air-filtering device may be configured to be arranged such that the air-impermeable back layer is placed adjacent to or against an inner surface of a convertible top, and the air-permeable front layer opposite to the back layer and in contact with the inner area B of the pram where the baby is to be positioned when using the pram.

According to another embodiment, the air-filtering device may be configured to be arranged by fastening means to an upper edge of the baby-transporting device. This would be practical in cases where the baby-transporting device does not have a convertible top.

The first air inlet may be arranged in the back portion or in the side portions. In an embodiment where the air-filtering device is to be arranged in a baby pram or similar baby-transporting device, the first air inlet may be placed in the back portion or in the side portions. However, in an embodiment where the air-filtering device is to be arranged on a baby-transporting device where the baby-transporting device in itself is to be further attached to e.g. a vehicle seat, the first air inlet should be placed in a side portion such that the further attachment of the baby-transporting device will not block the first air inlet. Regardless of where the first air inlet is positioned, the baffle should be placed on an inner surface of the internal cavity, directly opposite the first air inlet and the first ventilator.

According to one embodiment, a second air inlet is provided in the inner area. The second air inlet comprises an aperture in the air-permeable front layer and the inner air filter, and said second air inlet is tightly arranged in said front layer and inner air filter. Thereby, a recirculation of the air in the inner area is enabled. In connection with the second air inlet, a second ventilator may be provided in order to drive the airflow accordingly. However, it is important that the airflow provided through the second air inlet is lower than the airflow provided through the first air inlet, so as to not disrupt the air cushion already provided by air distributed by the first air inlet. A capacity of the second ventilator should be about 50%, 40%, 30%, 20%, 10% or 5% of a capacity of the first ventilator. Thus, part of the air in the inner area will be filtered again through the inner filter, further contributing to providing an air cushion of purified air around the baby. Ideally, the airflow through the first air inlet is in the order of about 2 m/sec, and the airflow through the second air inlet is about 0.2 m/sec.

The power driven ventilators are preferably driven by a battery. However, it may also be possible to use another power source such as solar cells. According to one embodiment, the air-filtering device is provided with a cable so that the ventilators may be charged and driven directly by electricity from a power outlet when such an outlet is available. It may also be provided with a cable that can be connected to a charging outlet in a car or any other vehicle. The cable may be detachable from the air-filtering device to ensure full portability.

According to one embodiment, the first ventilator is capable of causing a flow of air of 100-350 L/minute into the internal cavity of the device. Thus, an overpressure is created in the internal cavity of the air-filtering device. The overpressure results in the air being forced through the front layer and subsequently through the inner air filter. Thus, the thereby purified air will reach the inner area where the baby is positioned. As disclosed above, a second ventilator should provide a lower flow of air to not disrupt the initial airflow provided by the first ventilator. Preferably, the second ventilator should provide a flow of air that is 10-50% of that of the first ventilator.

The airflow provided to the inner area may preferably be less than 0.15 m/sec. According to one embodiment, said airflow is about 0.09 m/sec. An airflow below 0.15 m/sec will not be experienced as draughty by the baby. However, said airflow is sufficient to create a local environment of purified air, preventing non-purified air from outside of the baby-transporting device from reaching a baby positioned in the inner area B. This is relevant for all airflow reaching the inner area B, regardless of whether the airflow is provided by the first or second ventilator.

The outer air filter is adapted to prevent larger objects and macroparticles from the air entering the air-filtering device. It may for instance relate to leaves, gravel, larger soot flakes, plastic or paper garbage that may be carried by the wind, etc. Preferably the outer air filter is composed of a textile, a nonwoven textile, an open cell foam material, or a mesh material, but any material preventing larger objects and macroparticles from entering the air-filtering device may be used as the outer air filter, as long as the air is not prevented from being drawn or suctioned into the internal cavity of the device by the ventilator.

The air-filtering device according the present disclosure may be arranged in or on a baby-transporting device. Said baby-transporting device may be a pram, a stroller, a baby cot, a baby carrier or a baby car seat. Although the term "baby" has been used consistently throughout the present disclosure, it should be understood that also the terms "new-born", "toddler", "child" and "infant" are included in the scope of the invention.

FIG. 1 discloses one embodiment of the air-filtering device 1 of the present invention. FIG. 1 represents a top view cross section of the air-filtering device 1. The air-filtering device 1 comprises an air-impermeable back layer 2 and an air-permeable front layer 3. An external surrounding A and an inner area B are indicated. The external surrounding A is where air is drawn from and suctioned into the air-filtering device. The inner area B is where a baby is to be positioned in relation to the air-filtering device. Said back layer 2 and front layer 3 are arranged to form an internal cavity 4 there between. The air-filtering device further comprises a first air inlet 5, an outer air filter 6 and a first power driven ventilator 7. A power source for the ventilator 7 is not shown. A baffle 8 is positioned on an inner surface of the air-permeable front layer 3. An inner air filter 9 is arranged to face the inner area B.

Figure 2:
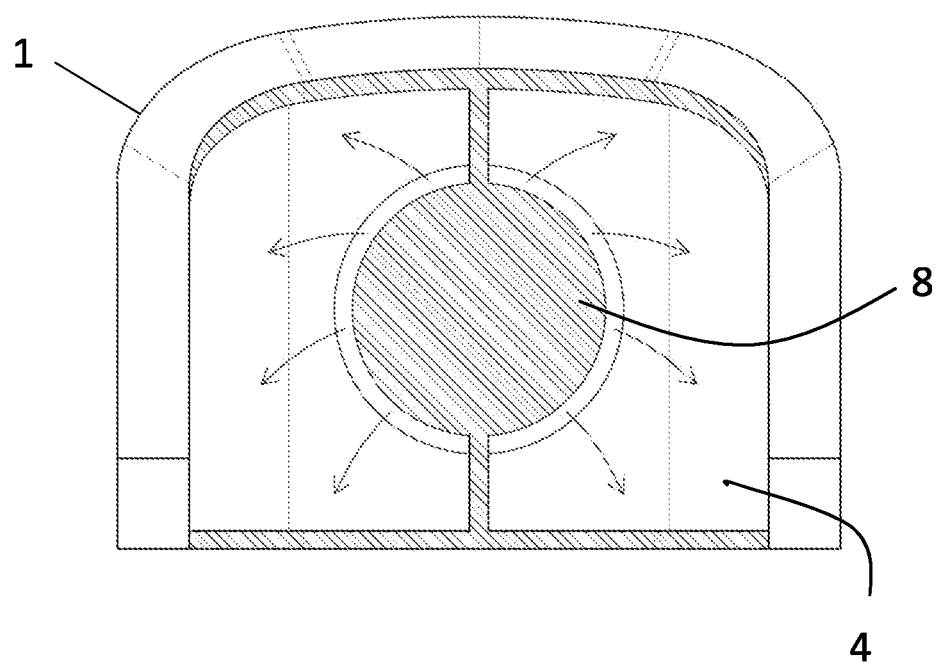
FIG. 2 discloses an embodiment for the placement of the baffle inside the internal cavity of the air-filtering device.

FIG. 2 discloses an embodiment of the air-filtering device 1 configured as disclosed in FIG. 1. In this figure, the device further discloses the placement of the baffle 8 in the internal cavity 4 of the air-filtering device 1. The arrows indicate the direction of airflow from the first ventilator (7, not shown), positioned behind the baffle 8 in the view of FIG. 2, and towards the side portions of the air-filtering device 1.

Figure 3:
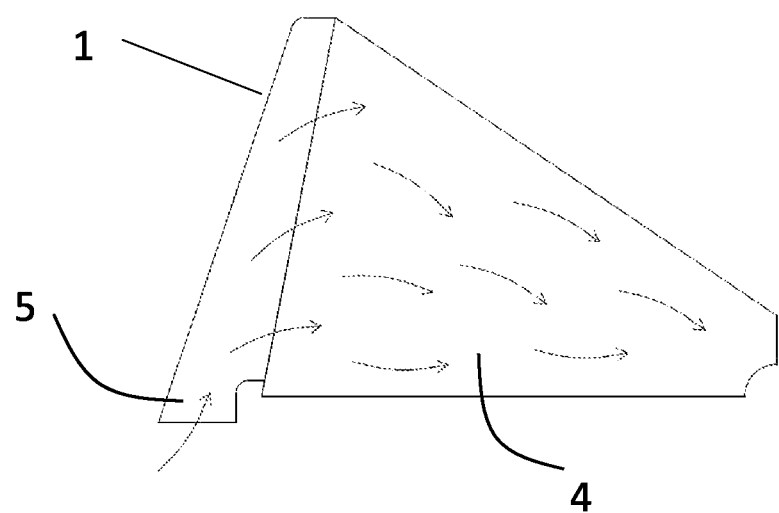
FIG. 3 is a schematic illustration of the airflow through the air-filtering device of the present disclosure.

FIG. 3 discloses the air-filtering device 1 configured as disclosed in FIG. 1, and further illustrates the airflow, as indicated by arrows, into and through the air-filtering device 1. The air is drawn in through the first air inlet 5 by means of the first ventilator (7, not shown)) and distributed within the internal cavity 4 by means of the baffle (8, not shown).

Figure 4A:
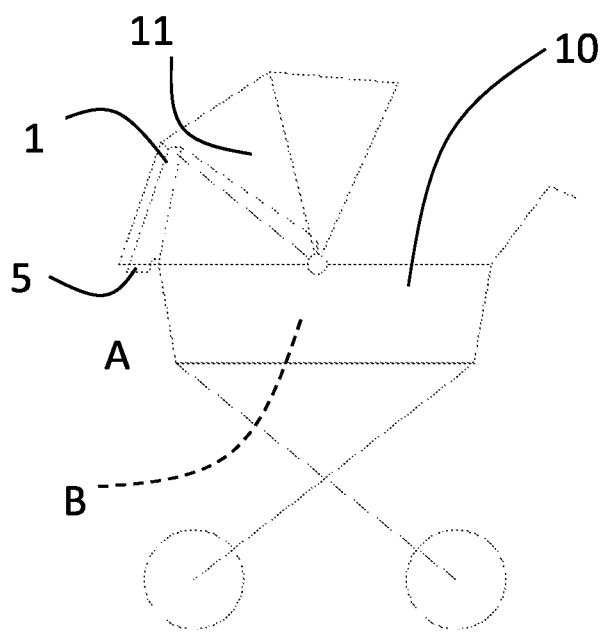
FIGS. 4a and 4b discloses an embodiment where an air-filtering device is arranged on a baby pram.
Figure 4B:
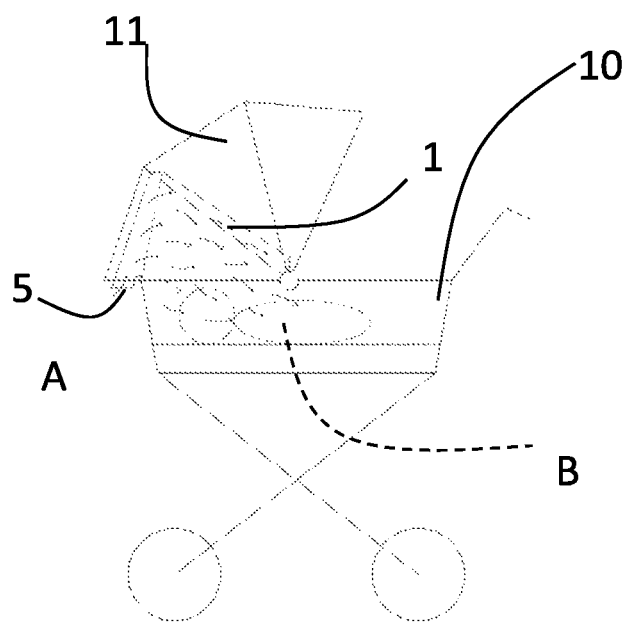

FIG. 4a illustrates one embodiment of the air-filtering device 1, configured as disclosed in FIG. 1, being arranged on a baby pram 10. In the depicted embodiment, the air-filtering device 1 is arranged in connection with the convertible top 11 of the pram 10. The first air inlet 5 is placed on a lower portion of the back layer of the air-filtering device 1, facing an external surrounding A indicated in front of the pram 10. An inner area B is indicated inside the pram 10, where a baby is to be positioned. FIG. 4b discloses the airflow of the air-filtering device 1 in FIG. 4a when the first ventilator (7, not shown) is activated. The airflow is indicated by arrows. Air will be suctioned in from the external surrounding A, through the first air inlet 5. Thereafter, the air will be distributed within the air-filtering device 1 and exit the air-filtering device 1 and reach the inner area B of the pram 10.

Figure 7A:
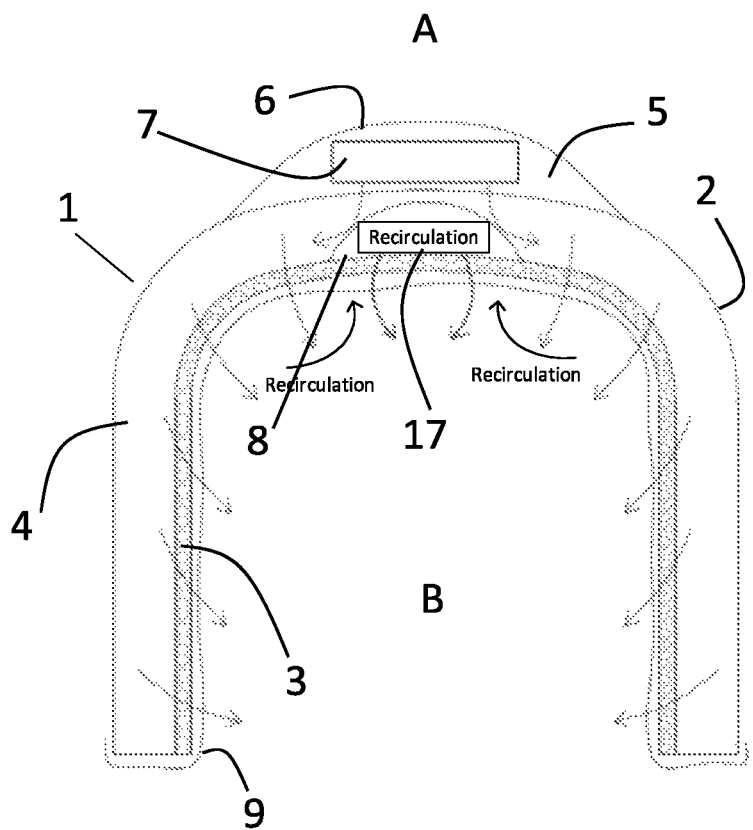
FIGS. 7a and 7b illustrates a cross-sectional view of an embodiment with recirculation of air where the device comprises a second air inlet.
Figure 7B:
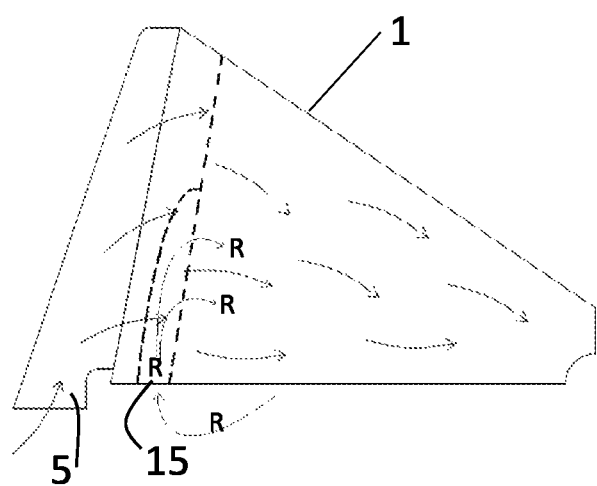

FIG. 7a discloses another embodiment of the air-filtering device 1 of the present invention. FIG. 1 represents a top view cross section of the air-filtering device 1, where many of the reference signs are identical to those for FIG. 1a. The device 1 in FIG. 7a additionally comprises a second air inlet (not indicated), causing air to be recirculated as indicated by the arrows marked "recirculation", and a second ventilator 17 driving said recirculated air back into the inner area B. FIG. 7b illustrates the same device as in FIG. 7a from a cross-sectional side view. The first air inlet 5 is located as previously, and the second air inlet 15 is indicated in the bottom end of the device 1. The arrows marked R indicate the airflow provided by the second air inlet 15 and the second ventilator (not shown).

Figure 8A:
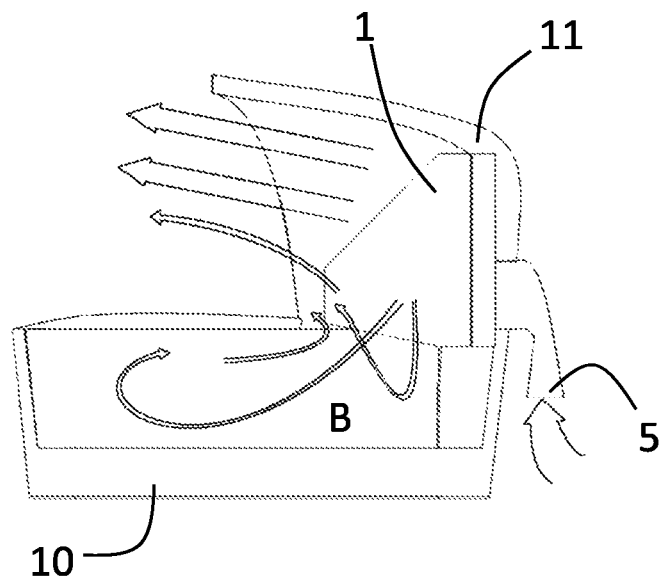
FIGS. 8a and 8b illustrates the airflow within a baby pram for different embodiments.
Figure 8B:
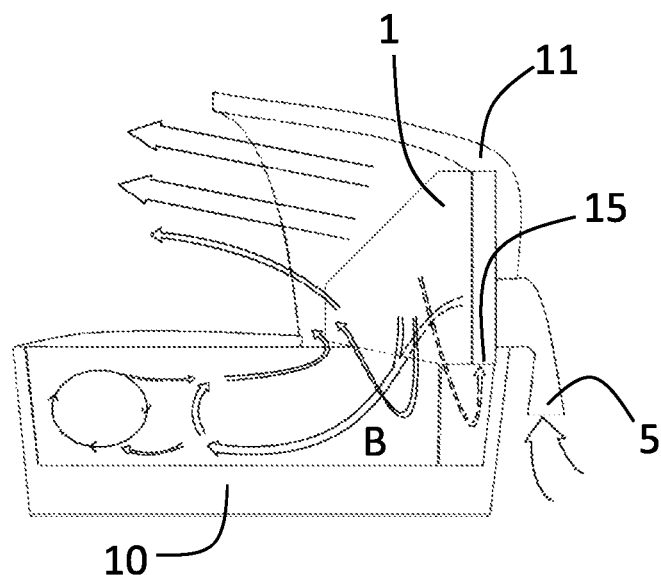

FIGS. 8a and 8b illustrates the airflow patterns within a baby-transporting device 10, in this case a pram, fitted with the air-filtering device 1 of the present disclosure. The air-filtering device 1 is fitted on an upper inner surface of a convertible top 11. A larger arrow illustrates a higher airflow, and a smaller, narrower arrow illustrates a lower airflow. FIG. 8a illustrates the airflow with a device 1 according to the embodiment having only a first air inlet 5. FIG. 8b illustrates the airflow with a device 1 having a first air inlet 5 and a second air inlet 15. In FIG. 8b the non-continuous arrow illustrates the recirculation of air through the second air inlet 15. As can be seen, this entails that the airflow more extensively reaches all parts of the pram 10.

Figure 9A:
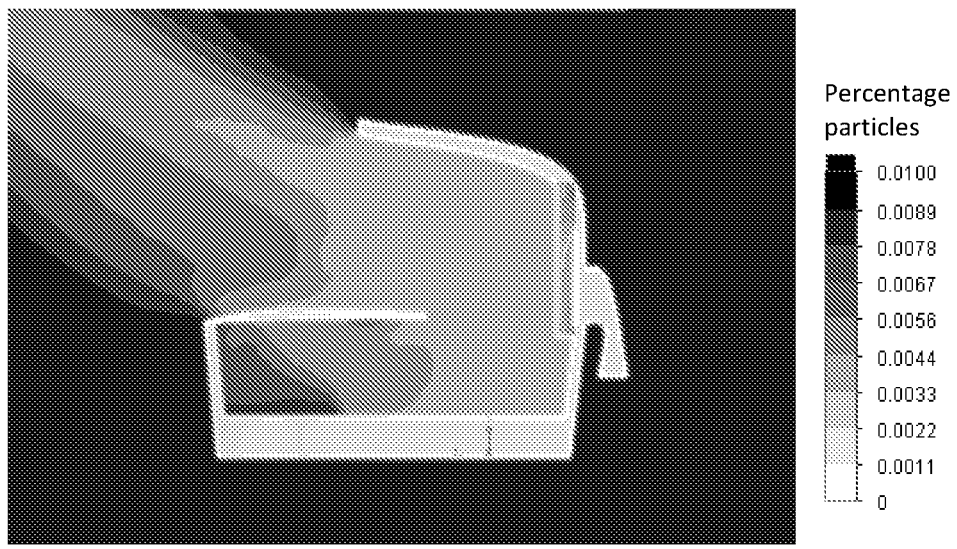
FIGS. 9a and 9b illustrates the degree of purified air within a pram having a device according to the present disclosure.
Figure 9B:
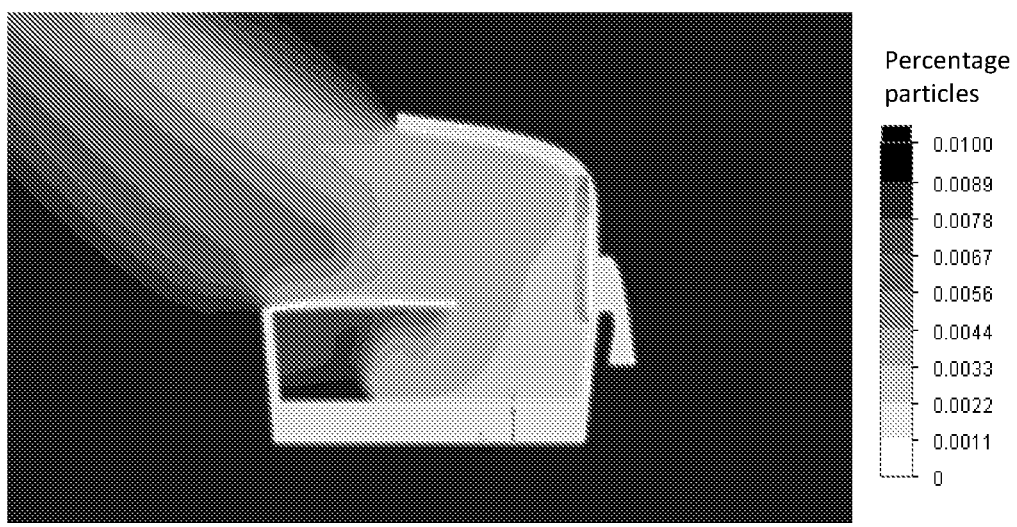

FIGS. 9a and 9b illustrate the degree of purification of air in different parts of a pram fitted with the device according to the present disclosure. FIG. 9a shows the purification for a device with one air inlet, and FIG. 9b the purification for a device with more than one air inlet. Black illustrates the surrounding background particle level. The background particle level is controlled as disclosed in the Experimental section under "Test II" and adjusted to a concentration of 1% particles in the air. The lighter the colour, the less particles are present in the air. It is thus clear that the air in the pram is significantly improved by use of the device according to the present disclosure. The device in FIG. 9a leads to a concentration of particles in the inner area of the pram of 0.22-0.33%, and the device in FIG. 9b leads to a concentration of particles in the inner area of the pram of 0.11-0.22%. The device with more than one air inlet (FIG. 9b), and thus a recirculation of the air in the pram through the device, thus shows a further improved purification of about 10% as compared to the device with one air inlet (FIG. 9a).

FIGS. 10a-d further illustrates the degree of purification with the present device at different location in a pram fitted with the air-filtering device of the present disclosure. FIG. 10a illustrates the measuring points where the amount of particles were measured, as disclosed in the experimental section below under "Test II". FIG. 10b further discloses the exact positions of the measuring points.

FIG. 10c illustrates the concentration of particles present at the different measuring points for a device with one air inlet. It is clear that at the measuring points 1 and 2, where a baby's head would normally be positioned within the pram, the concentration of particles is significantly reduced to around 40% of the amount of particles in the air coming in through the first air inlet.

FIG. 10d illustrates the concentration of particles present at the different measuring points for a device with more than one air inlet. Again, the concentration of particles is significantly reduced at the measuring points 1 and 2, where a baby's head would normally be positioned within the pram. For this embodiment, the concentration of particles is about 30%-40% of the amount of particles in the air coming in through the first air inlet. As disclosed, particles in the size range of 0.1 µm to 2.5 µm were measured, and hence were filtered with the device of the present disclosure.

EXPERIMENTAL SECTION

Test I

Figure 5A:
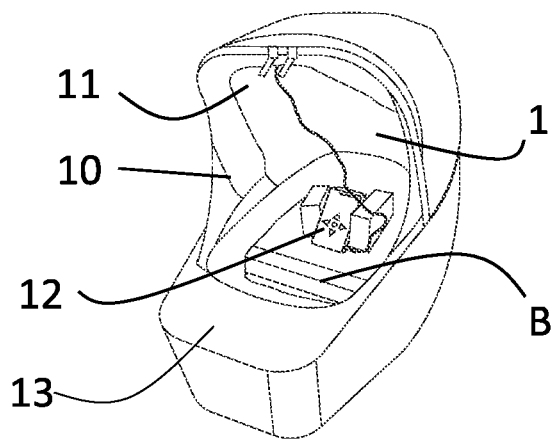
FIGS. 5a and 5b discloses the set-up of a particle measurement device in a baby pram for the tests conducted in the Experimental section.
Figure 5B:
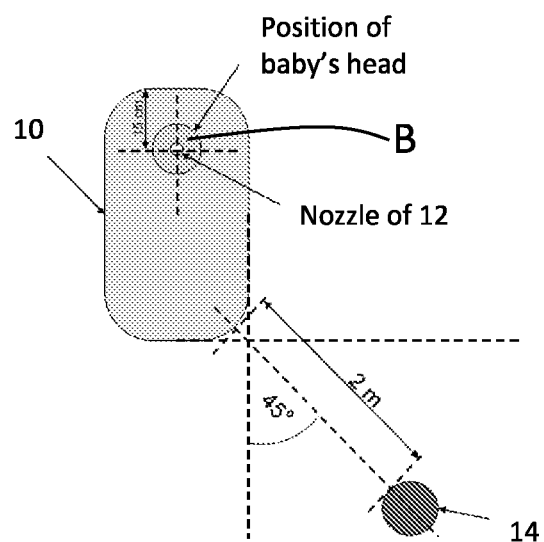

Tests were conducted using a baby pram 10, having an air-filtering device 1 according to one embodiment of the present invention arranged in the convertible top 11 of said pram 10, illustrated in FIGS. 5a and 5b. Measurements of the amount of particles in the inner area B were conducted. A particle measuring device 12 (Handheld 3013 Particle Counter, Lighthouse Worldwide Solutions) was positioned with its nozzle 15 cm from the internal edge of the pram 10, as indicated in FIGS. 5A and B, and 15 cm above the mattress of the pram, which can be seen in FIG. 5A. This is approximately where a baby's head, and in particular the nose and mouth, would be if a baby is positioned in the pram 10, corresponding to an inner area B. A pram 10 normally has an integrated cover 13 that can be closed in order to create a comfortable and protective environment for a baby therein. This type of cover 13 exists on nearly all prams 10 available on the market. The cover 13 is normally closed and opened using a zip fastener and buttons. Tests were performed with this integrated cover 13 in three different positions; A cover 13 completely closed with both zip fastener and buttons corresponding to a 75% closure of the pram 10; A cover 13 closed only by the zip fastener but not the buttons corresponding to a 50% closure of the pram 10; A completely open cover 13 corresponding to a 0% closure of the pram 10.

Every test was repeated 3 times, and the mean values are shown below. Six measurements were used for calibration of the starting point for the measurement, which is equal to 100% particles. Eight measurements were registered after activating the air-filtering device according to the invention. Thus, one test comprised 14 cycles of 30 seconds. In each test, microparticles with the sizes of 2, 5 and 10 microns were measured.

The airflow was roughly calculated by fitting a plastic bag around the air-permeable inner layer of the air-filtering device 1 and measuring the time to fill said plastic bag with air. The volume of the plastic bag was 130 L, corresponding to 0.130 m³. In all the tests, the ventilator (not shown) of the air-filtering device 1 was powered by 12V, 0.06 A. The time it takes for the plastic bag to be filled with air in this set up is 30 sec. The airflow thus amounts to 0.130/30*3600=15.6 m³/h.

To determine if the above-mentioned set-up would lead to a draughty environment within the pram 10, the draught was also calculated. The discharging area of the air-filtering device 1 is 0.05 m². This amount to 15.6/3600/0.05=0.09 m/Sec. A draught is experienced at about 0.2 m/sec. Thus, the air-filtering device 1 of the invention will not lead to a draught over a baby positioned in the pram 10.

All the tests were performed with a rotating external ventilator 14 active at a distance of 2 m from the pram 10, as indicated in FIG. 5b, where also the position of the external ventilator 14 in relation to the pram 10 is indicated. The pram 10, without any chassis with wheels, was positioned on a table at a height of 53 cm above the floor. The centre of the external ventilator 14 was positioned approx. 102 cm above the floor. Thereby the ventilator 14 would regularly blow air directly towards the inner area B of the pram 50.

Test 1—75%

12V, 0.06 A, 75% closure.

TABLE 1

| Time (min.) | 2 micron | 5 micron | 10 micron |
| --- | --- | --- | --- |
| 0 | 100 | 100 | 100 |
| 0.5 | 23 | 16 | 23 |
| 1 | 6 | 3 | 7 |
| 1.5 | 3 | 3 | 1 |
| 2 | 2 | 3 | 0 |
| 2.5 | 4 | 4 | 8 |
| 3 | 3 | 2 | 1 |
| 3.5 | 4 | 1 | 1 |
| 4 | 1 | 0 | 0 |

The measurement of 0.5 min corresponds to the seventh measurement in the test of 14 cycles of 30 sec. The results above are also depicted as a diagram in FIG. 6A.

Test 2—50%

12V, 0.06 A, 50% closure.

TABLE 2

| Time (min.) | 2 micron | 5 micron | 10 micron |
| --- | --- | --- | --- |
| 0 | 100 | 100 | 100 |
| 0.5 | 29 | 24 | 25 |
| 1 | 4 | 4 | 5 |
| 1.5 | 12 | 11 | 17 |

TABLE 2-continued

| Time (min.) | 2 micron | 5 micron | 10 micron |
|---|---|---|---|
| 2 | 9 | 5 | 5 |
| 2.5 | 13 | 8 | 5 |
| 3 | 11 | 8 | 8 |
| 3.5 | 5 | 2 | 9 |
| 4 | 15 | 12 | 10 |

The measurement of 0.5 min corresponds to the seventh measurement in the test of 14 cycles of 30 sec. The results above are also depicted as a diagram in FIG. 6B.

Test 3—0%

12V, 0.06 A, 0% closure.

TABLE 3

| Time (min.) | 2 micron | 5 micron | 10 micron |
|---|---|---|---|
| 0 | 100 | 100 | 100 |
| 0.5 | 27 | 27 | 25 |
| 1 | 19 | 21 | 16 |
| 1.5 | 16 | 11 | 14 |
| 2 | 13 | 11 | 7 |
| 2.5 | 14 | 7 | 13 |
| 3 | 14 | 17 | 15 |
| 3.5 | 12 | 13 | 10 |
| 4 | 12 | 8 | 8 |

The measurement of 0.5 min corresponds to the seventh measurement in the test of 14 cycles of 30 sec. The results above are also depicted as a diagram in FIG. 6C.

Test II

Particle Measurement Test for Exhaust Particles

The test was carried out with a modified pram insert where a fan and a filter were mounted to fan filtered air into the pram insert. The pram insert was set up in an exposure chamber where the particle mass (PM) level was about 319 $\mu g/m^3$.

The particles were generated by running a diesel engine motor transiently (ETC city part) and the exhaust gases were diluted in two steps down to the desired level. The system is described in Nystrom 2016 (Nystrom Robin, Particle emissions from residential wood and biodiesel combustion, Doctoral Thesis, 2016, Umea University). SD10 has been used as a fuel (a diesel reference fuel). The test setup and particle level has been used in several studies for evaluating filters, examples are Rudell et al. 1999 (Rudell B, Blomberg A, Ledin M-C, Lundback B, Stjernberg N, Horstedt P, SandstrOm T. *Bronchoalveolar inflammation after exposure to diesel exhaust: comparison between unfiltered and particle trap filtered exhaust. Occup Environ Med.* 1999; 56:527-34), Rudell et. al. 1999 (Rudell B, Wass U, Ostberg Y, Horstedt P, Ranug U, Lindhal R, Sunesson A-L, Levin J, Sandstrom T. *Efficiency of automotive cabin air filters to reduce acute health effects of diesel exhaust in human subjects. Occup Environ Health* 1999; 56: 222-231), Maula et. al. 2014 (Muala A, Sehlstedt M, Bion A, Osterlund C, Bosson J A, Behndig A F, Pourazar J, Bucht A, Boman C, Mudway I S, Langrish J P, Couderc S, Blomberg A, Sandstrom T. *Assessment of the capacity of vehicle cabin air inlet filters to reduce diesel exhaust induced symptoms in human volunteers. Environ Health.* 2014; 13(1):16) and Lucking A J. et. al. 2011 (Lucking A J, Lundback M, Barath S L, Mills N L, Sidhu M K, Langrish J P, Boon N A, Pourazar J, Badimon 11, Gerlofs-Nijland M E, Cassee F R, Boman C, Donaldson K, Sandstrom T, Newby D E, Blomberg A. *Particle traps prevent adverse vascular and prothrombotic effects of diesel engine exhaust inhalation in men. Circulation.* 2011 Apr. 26; 123(16):1721-8).

The particle mass (PM) content was measured in the chamber and in the opening of the pram insert.

First, the engine and dilution system were started for the system to come into equilibrium. When the system was in equilibrium, the concentration of particulate mass (PM) was measured gravimetrically on the filter (which was used to calibrate the instruments for PM). Then the pram insert was set into the exposure chamber without the fan being started. When the equilibrium with the chamber was obtained in the pram insert the fan was started. At the end of the test, the fan was turned off, and the measurements were allowed to continue for a few minutes before the measurement system was switched off.

Used Measuring Equipment:

Particles mass (PM) in pram insert Pegasor, PPS-M

Particles mass (PM) in chamber Teom, 1400a

The particle size interval from 0.1 µm to 2.5 µm in diameter was covered by the measurement.

The data from the measurements were subsequently used for a model and simulation according to the following.

Solidworks Flow Simulation 2015

The program used is a parametric flow simulation program that uses a finite volume method. The finite volume method sets up and evaluate partial differential equations in discrete locations set up in a mesh. The differential equations used are connected to the flow phenomena that occurs in nature and the simulation program has such phenomena coupled to the different functions thereof. Examples of functions being used in the calculations are: flow volume in, flow volume out, velocity in and out, etc. The mesh is a grid that is used to divide the working space into multiple small volume cells on specific locations where the differential equation may thereafter be applied. Depending on the applied settings for the mesh, the results may vary. It is desirable to obtain a mesh that has a high degree of refinement, in order to be able to apply said differential equations in additional locations and obtain a response that is closer to a reality. In the conducted calculations, a refinement level of six was used forthe initial mesh, a level that is often sufficient for studying general flow changes. If it is of interest to investigate the flow for specific areas, it is possible to further refine the mesh in that specific area.

Method

In order to be economical regarding computing and time for calculation, the calculations were performed in a half model. This means that the object, in this case a pram, was symmetrically divided into two equally sized parts. A symmetrical condition was used for the divided area. This condition causes the calculation program to take into consideration an equally large half object on the other side division area.

In the present calculation, no clear models for ventilators were used. The ventilators were instead modelled as inlets and outlets on different surfaces where a flow volume in/out was generated. The ventilator used in previous tests was well described and therefore, the approximation was made that a surface generated such a known airflow. This surface also represented the ventilator.

Based upon previous tests, there is also information regarding the degree of purification that the inner filter was able to generate. Therefore, a known mixture of pure and polluted air was directed towards the inlet of the pram and the filter itself was not modelled in the calculations. The pollution particles were approximated as a unit of gas, carbon dioxide, added to a value of 1% in the atmosphere where the remaining 99% was pure air. However, air with 0.4% pollutions were modelled to enter the pram, as it was already known that the inner filter removes about 60% of the polluting particles.

In the continued calculations, also a recirculation unit was introduced, consisting of an inlet and an outlet. The theory was that the purified air would pass through a filter in order to thereby increase the degree of purification. The degree of purification that the added filter could contribute with was unknown. An assumption was made that statistic may be applied, and that by making the particles pass through a new filter, it should be statistically supported that more pollution particles were captured. In the calculations, this number was assumed to be 10%, meaning that 10% of the polluting particles that have passed through the first filter, will be captures in the recirculation filter. Hence, this number is an assumption, and not the result of any tests.

In order to also examine how individual particles act when the airflows above are applied, also a particle study was conducted. The study is based on that particles of a particular size and density are injected into the system. The particle size was assumed to be 10 and 100 micrometer in diameter, respectively, and the density was assumed to be that of a solid carbon particle. The particles were assumed to be spherical.

The results of the simulations are illustrated in FIGS. 9 and 10.

DISCUSSION

Figure 6A:
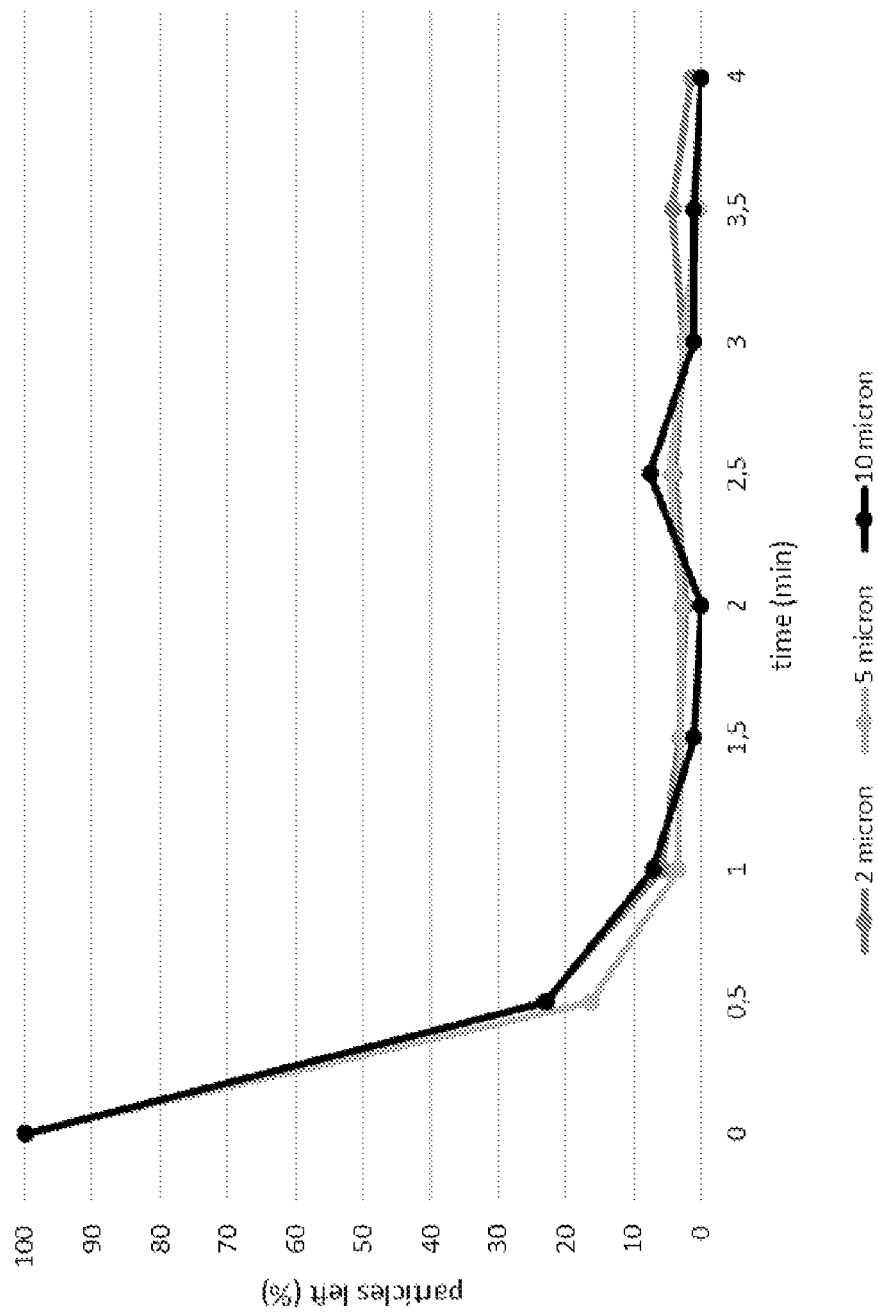
FIGS. 6a, 6b and 6c are diagrams of the tests conducted in the experiment as illustrated in FIGS. 5a-b.
Figure 6B:
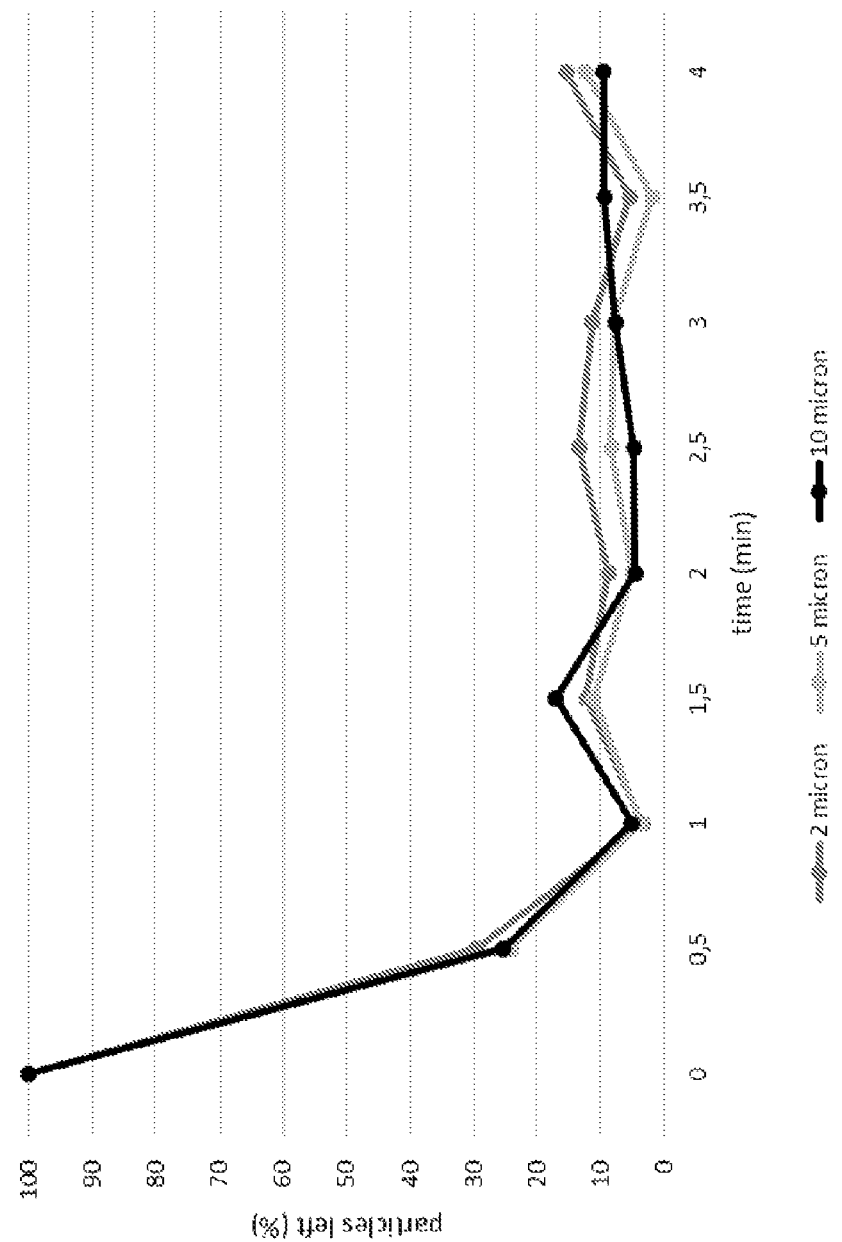
Figure 6C:
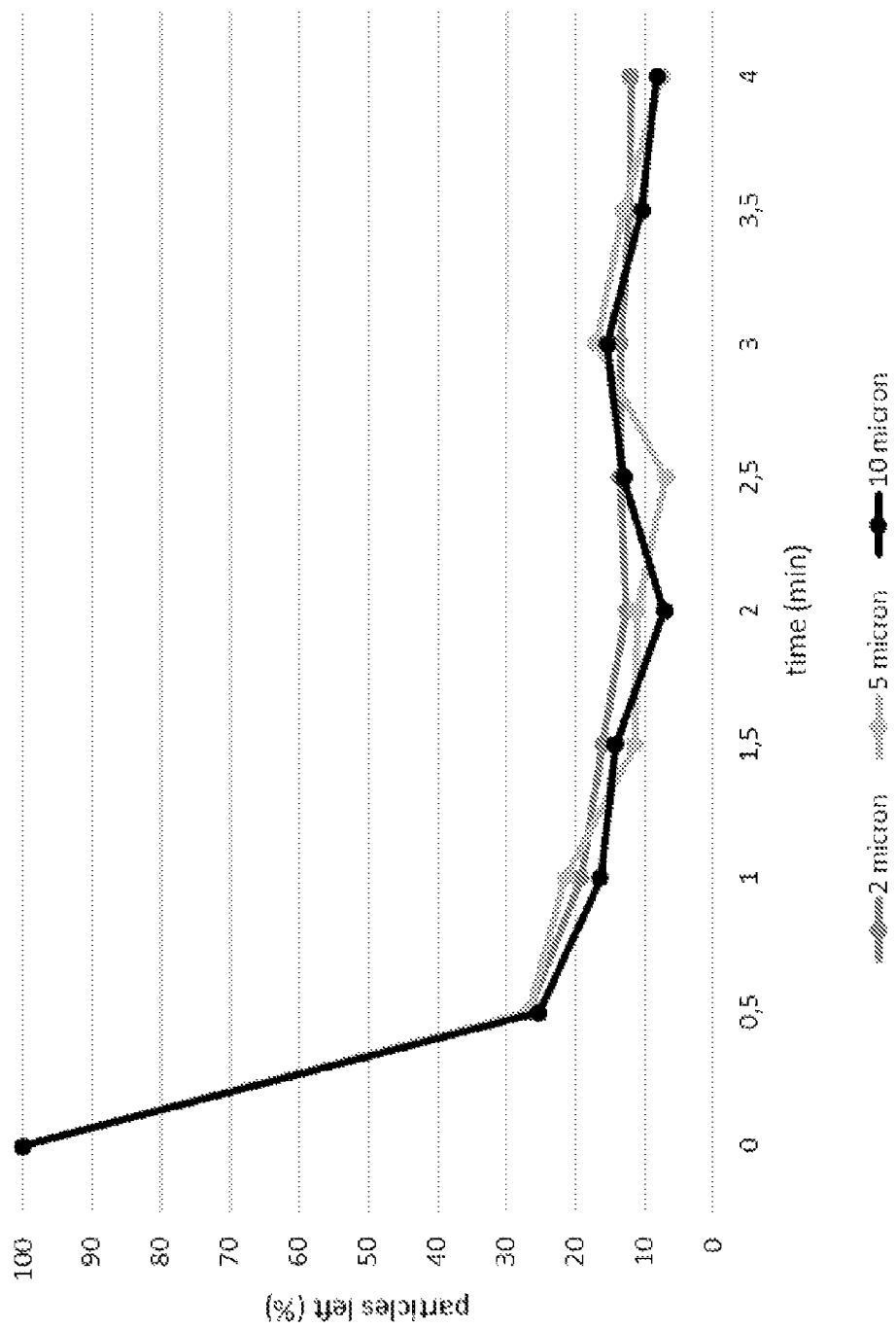

The results from the conducted tests above clearly show that the air-filtering device of the present invention effectively can purify air to be delivered to the inner area of a pram, see FIGS. 6a-c. As shown in FIG. 6c, even when a pram is completely open, the air-filtering device is capable of preventing the non-purified surrounding air from entering the inner area. Furthermore, as illustrated in FIGS. 9 and 10, the percentage of microparticles present in the air in the inner area B is significantly reduced compared to the surrounding air, using the device of the present disclosure. Thus, a local environment of purified air is provided around the baby when the device of the present disclosure is fitted on a baby-transporting device.

The invention claimed is:

1. A portable air-filtering device, the air-filtering device being configured to be arranged in association with a top end of a baby-transporting device, said top end being a part of the baby transporting device where a baby's head is positioned, or a part close to or directly adjacent to a part where the baby's head is positioned, wherein the air-filtering device comprises:
an air-impermeable back layer;
an air-permeable front layer arranged opposite to the back layer, wherein the air-filtering device is configured to be arranged with the front layer directed towards an inner area of the baby-transporting device; said back layer and front layer being arranged to form an internal cavity there between;
a first air inlet arranged in the back layer in fluid communication with the internal cavity;
an outer air filter arranged to cover the first air inlet;
a first power driven ventilator arranged to draw air from an external surrounding through the first air inlet into the internal cavity, so that an overpressure is generated in the cavity;
a baffle arranged in the internal cavity to direct the air inside the internal cavity; and
an inner air filter arranged to face the inner area of the baby-transporting device,
wherein the overpressure in the internal cavity will force the air to flow through said front layer towards the inner area, wherein the front layer comprises a material configured such that the air will be evenly distributed within the front layer before exiting said front layer whereby the air will be evenly distributed through the inner air filter, thereby providing a local environment of purified air in the inner area of the baby-transporting device,
and wherein the inner air filter is adapted to remove microparticles having a size of 0.1-1000 µm from the air.

2. The air-filtering device according to claim 1, wherein the device is essentially U-shaped with a back portion and side portions, the first air inlet being arranged in the back portion, and wherein the baffle directs the air from the back portion to the side portions of the device.

3. The air-filtering device according to claim 1, wherein the device is flexible.

4. The air-filtering device according to claim 1, wherein the inner air filter is an electrostatically charged material.

5. The air-filtering device according claim 4 wherein the electrostatically charged material is a non-woven textile, preferably of spunbound polypropylene.

6. The air-filtering device according to claim 1, wherein the inner air filter is a triboelectric filter.

7. The air-filtering device according to claim 1, wherein the inner air filter comprises active carbon.

8. The air-filtering device according to claim 1, wherein the air-permeable front layer comprises a material allowing a turbulent airflow internally.

9. The air-filtering device according to claim 1, wherein the air-permeable front layer comprises an open cell foam material.

10. The air-filtering device according to claim 1, wherein the first ventilator is capable of causing a flow of air of 100-350 L/minute into the internal cavity of the device.

11. The air-filtering device according to claim 1, wherein the airflow provided to the inner area is less than 0.15 m/sec.

12. The air-filtering device according to claim 1, wherein the outer air filter is a nonwoven textile, an open cell foam material, or a mesh material adapted to filter larger objects and macroparticles from the air entering the device.

13. The air-filtering device according to claim 1, further comprising at least one second air inlet arranged adjacent to the inner area, and at least one second ventilator arranged in connection with the second air inlet, said second ventilator being arranged to draw air from the inner area through the second air inlet into the internal cavity.

14. The air-filtering device according to claim 13, wherein the second ventilator has a capacity that is lower than a capacity of the first ventilator.

15. The air-filtering device according to claim 1, wherein the power driven ventilator is driven by a battery.

16. A baby-transporting device, comprising an air-filtering device according to claim 1.

17. The baby-transporting device according to claim 16, wherein the baby-transporting device is a pram, a stroller, a baby cot, a baby carrier or a baby car seat.

* * * * *